(12) United States Patent
Bastioli et al.

(10) Patent No.: US 10,745,542 B2
(45) Date of Patent: Aug. 18, 2020

(54) BIODEGRADABLE PELLETS FOAMED BY IRRADIATION

(71) Applicant: Novamont S.p.A., Novara (IT)

(72) Inventors: Catia Bastioli, Novara (IT); Roberto Lombi, Novara (IT); Matteo Nicolini, Borgomanero (IT); Daniele Turati, Buscate (IT)

(73) Assignee: NOVAMONT S.P.A., Novara (IT)

( * ) Notice: Subject to any disclaimer, the term of this patent is extended or adjusted under 35 U.S.C. 154(b) by 374 days.

(21) Appl. No.: 15/709,837

(22) Filed: Sep. 20, 2017

(65) Prior Publication Data

US 2018/0009970 A1 Jan. 11, 2018

Related U.S. Application Data

(62) Division of application No. 13/697,668, filed as application No. PCT/EP2011/057802 on May 13, 2011.

(30) Foreign Application Priority Data

May 14, 2010 (IT) .............................. MI2010A0865

(51) Int. Cl.
*C08L 3/02* (2006.01)
*C08J 7/12* (2006.01)
*C08J 9/16* (2006.01)
*C08J 9/34* (2006.01)
C08L 29/04 (2006.01)

(52) U.S. Cl.
CPC ................ *C08L 3/02* (2013.01); *C08J 7/123* (2013.01); *C08J 9/16* (2013.01); *C08J 9/34* (2013.01); C08J 2201/03 (2013.01); C08J 2205/044 (2013.01); C08J 2300/16 (2013.01); C08J 2303/02 (2013.01); C08L 29/04 (2013.01); *Y10T 428/2991* (2015.01); *Y10T 428/2998* (2015.01)

(58) Field of Classification Search
CPC ........................................................ C08L 3/02
See application file for complete search history.

(56) References Cited

U.S. PATENT DOCUMENTS

| 5,589,518 A | 12/1996 | Bastioli et al. |
| 6,723,264 B1 | 4/2004 | Bussey, Jr. et al. |
| 2001/0014388 A1 | 8/2001 | Bastioli et al. |
| 2007/0021515 A1 | 1/2007 | Glenn |
| 2008/0058228 A1 | 3/2008 | Wilson |
| 2008/0070998 A1 | 3/2008 | Takada |
| 2010/0016470 A1 | 1/2010 | Bastioli et al. |
| 2010/0081737 A1 | 4/2010 | Bastioli |

FOREIGN PATENT DOCUMENTS

| EP | 0587078 A1 | 3/1994 |
| EP | 0696611 A2 | 2/1996 |
| EP | 0989158 | 3/2000 |
| EP | 1127914 A2 | 8/2001 |
| WO | WO-93/08014 A1 | 4/1993 |
| WO | WO-02/14043 A1 | 2/2002 |
| WO | WO-03/037598 A2 | 5/2003 |

*Primary Examiner* — Jacob T Minskey
(74) *Attorney, Agent, or Firm* — Polsinelli PC

(57) ABSTRACT

This invention relates to biodegradable starch-based pellets which foamable by irradiation, which are particularly suitable for the manufacture of foam articles, characterised in that they have a porous structure with a low porous external skin. This invention also relates to foam articles obtained from these.

20 Claims, 4 Drawing Sheets

Internal structure of the pellet according to Example 1

Internal structure of the pellet according to Example 1

External skin of the pellet according to Example 1

Foamed cylinder according to Example 2 (foamed at 55 kg/m$^3$)

Cell walls of the foamed block according to Example 2 (foamed at 55 kg/m$^3$)

Foamed block according to Comparative Example 2 (foamed at 55 kg/m³)

Internal structure of the pellet according to Comparative Example 3

External skin of the pellet according to Comparative Example 3

Pellets after irradiation according to Comparative Example 4

BIODEGRADABLE PELLETS FOAMED BY IRRADIATION

CROSS REFERENCE TO RELATED APPLICATIONS

This application is a Divisional of U.S. application Ser. No. 13/697,668 filed on Nov. 13, 2012, which is a National Phase filing under 35 U.S.C. § 371 of PCT/EP2011/057802 filed on May 13, 2011; and this application claims priority to Application No. MI2010A000865 filed in Italy on May 14, 2010 under 35 U.S.C. § 119; the entire contents of all are hereby incorporated by reference.

DESCRIPTION

This invention relates to biodegradable low density, self-sealing pellets foamable through irradiation particularly suitable for the production of high cushioning foamed articles, comprising high viscosity starch which is essentially free of native crystallinity characterised in that they have an internal porous structure with a low porous external skin.

This invention also relates to foam articles obtained from these pellets characterized by thin-walled cells and dynamic shock cushioning characteristics comparable or even better than expanded polystyrene (EPS) with density of 26 kg/m3. Because of their cushioning characteristics the foamed articles according to the invention can be used at equal or lower thickness than EPS foams Among the foam materials conventionally used as protective packaging, EPS is undoubtedly the most widely used because of its mechanical properties, for example its impact strength, compressibility, cushioning properties, low density, heat insulating characteristics and low cost.

The use of EPS is particularly suitable for packaging of a wide range of goods such as, CD-DVD players (fragility factor expressed in G's of 40-60), Hi-Fi, TV's (G's of 60-85), electric—home—appliances (G's of 85-115) or industrial equipments (G's>115).

However, the widespread use of EPS in the field of protective packaging has created problems associated with the accumulation and disposal of this material. In addition to this, the synthetic origin of the monomer of which it is composed limits the ability of this material to significantly reduce the consumption of resources (feedstocks) originating from non-renewable carbon.

The plastics industry has therefore focused its activities in researching and developing new materials having properties similar to those of conventional foam materials which at the same time help to solve the environmental problems associated with the accumulation of these materials and their disposal at the end of their life cycle, as well as the consumption of resources originating from non-renewable carbon.

In this respect attempts to produce foam materials based on starch, which being biodegradable and from a renewable source offer a first attempt at solution of the abovementioned problems, are known in the state of the art.

Starch-based foam materials may for example be prepared by means of extrusion processes of starch-based compositions conducted in the presence of large quantities of water, such that expansion takes place directly at the outlet from the extruder as a result of rapid evaporation of the water leaving the extruder. In such a case intrinsic viscosities between 0.5 and 1.5 dl/g have to be achieved in order to obtain low density foams at the exit of the die. It means a very high molecular weight reduction in comparison with the starting material resulting in a resiliency far less than EPS. Moreover, in order to obtain three-dimensional protective packaging structures (so-called foam blocks), it is necessary adding adhesives due to the non self-sealing skin of said starch-based materials. As far as the foamed materials obtained therefrom is concerned, they show high sensitivity to humidity.

An alternative method for preparing starch-based foam materials comprises compression/decompression treatment of non-foamed pellets at high temperature. These pellets are subjected to a higher than atmospheric pressure in the presence of water vapour, and then rapid decompression. During the pressurising treatment water penetrates within the pellets. The sudden sharp fall in pressure causes sudden evaporation of the water present in the material and its consequent expansion.

Yet another method of preparing a foam material comprises subjecting the unfoamed pellets of the type described above to a treatment of irradiating them with microwaves. In particular, because of the possibility of imparting high energy densities to the surface and interior of the pellets the latter type of process allows the water contained within them to be heated and quickly evaporated causing expansion of the pellets.

These irradiation expansion processes have significant difficulties. It is in fact difficult to ensure that the pellet expands in a regular way in the course of irradiation at atmospheric pressure, with good self-sealing and creating a uniform distribution of cells at low cell wall thickness, moreover achieving sufficiently low density values and resiliency to render the foamed materials so produced competitive on the market.

The problem underlying this invention is therefore that of finding a biodegradable material in the form of low density self-sealing pellets foamable by irradiation allowing the production of expanded articles having a regular homogeneous structure, mechanical properties, dimensions, cell distribution, cell wall and density so as to enable them to be effectively used as a replacement for the foam materials conventionally used as protective packaging.

Starting from this problem it has now been surprisingly found that it is possible to obtain pellets foamable by irradiation even at atmospheric pressure that are particularly suitable for the production of high cushioning foam articles characterized by thin-walled cells, said pellets comprising high viscosity starch which is essentially free of native crystallinity and characterised in that they have a porous internal structure with a low porous external skin.

In particular the present invention refers to biodegradable low density, self-sealing pellets foamable by irradiation particularly suitable for the production of foamed articles said pellets comprising starch essentially free of native crystallinity and being characterised by

- a porous internal structure having void area greater than 15% with respect to the area of the cross-section of the pellet;
- a mean equivalent diameter of pores less than 100 microns and
- an external skin with pores in number less than 80% with respect to the internal structure having a mean equivalent diameter lower or equal to the mean equivalent diameter of the pores of the internal structure.

The characteristics and advantages of the pellets according to the present invention and the foamed articles obtained from them in comparison with the known art will be obvious from the following description.

By pellets are here meant discrete portions of plastic material, preferably obtained by extrusion processes, regardless of their shape and size.

Preferably, the pellets according to this invention are of a substantially spherical, helicoidally, disk-shaped, cylindrical or toroidal shape, or are 8, S or U ring-shaped or of any other shape which can be obtained by passage through a nozzle. In case of pellets, the dimensions of the pellets according to this invention preferably lie between 0.1 and 10 cm, preferably between 0.3 and 3 cm and more preferably between 0.5 and 2.5 cm measured along the largest dimension. It is also possible to produce ribbons, plates, profiles or even shaped parts which can be foamed through irradiation.

The pellets according to the present invention are defined as "low density" with this expression being meant that said pellets, when conditioned to a water content of 22±2% by weight with respect to the total weight of the dry composition, have a density of <1.1 g/cm3 and higher than 0.5 g/cm3 and preferably <1 g/cm3 and higher than 0.6 g/cm3. The density of the pellets is lower than the density of their polymeric components and specifically of the amorphous starch density (1.4 g/cm3) because of the presence of the porous structure. Preferably the density of the "low density" pellets has to be comprised between 80 and 35% and more preferably between 70 and 45% of the density of the non porous material.

Said porous structure preferably show a uniform distribution of pores throughout the entire pellet structure (i.e. a highly-dispersed system of pores).

Said porous structure shows pores which can be of regular and/or irregular shape. It means that said pores, when seen in cross-section, may be of a circular, elliptical shape or of whatever other shape.

Said porous structure is advantageously characterized in that the total area of the pores detectable in a cross-section of the pellet (so-called void area) is higher than 15%, preferably higher than 20% with respect to the total area of said cross-section and that said pores show a mean equivalent diameter of less than 100 μm, preferably less than 50 μm, more preferably less than 30 μm and even more preferably less than 20 μm.

In particular, void area and mean equivalent diameter of the pores may be determined on a portion of pellet whose internal structure has been rendered accessible for examination under scanning electron microscope (SEM) For this purpose the pellet which is to be examined is immersed in liquid nitrogen and subsequently fractured so as to obtain a fracture surface along a cross-section of the pellet. The portion of the pellet which is to be examined is then dried and a thin layer of metal is deposited thereupon, for example a mixture of gold/palladium, using a "sputter coater". Finally the surface of the fracture is examined under SEM and void area and equivalent diameter of the pores are measured. By equivalent diameter is meant here the diameter of the circular pore that exhibits the same area to that of the investigated pore.

The area of the pores can be measured either by using image analysis softwares or by manual methods.

The void area can be calculated according to the following equation:

$$\text{void area (\%)} = \frac{\sum_{i=1}^{N} A_i}{D} * 100$$

where:
A is the area of pores which can be seen in the SEM inside the cross-section examined expressed in micron$^2$,
N is the number of pores which can be seen in the SEM inside the fracture surface area examined,
D is the area of the cross-section of the pellet examined at the SEM expressed in micron$^2$.

The mean equivalent diameter can be calculated according to the following equation:

$$\text{mean equivalent diameter} = \frac{\sum_{i=1}^{N} d_i}{N}$$

where:
N is the number of pores which can be seen in the SEM inside the fracture surface area examined,
$d_i$ is the equivalent diameter of the individual pores.

The pores preferably show a closed cells structure with less than 30% of pores interconnected each other.

The external skin of pellet according to the present invention is defined as "low porous", by this term it being meant that said skin shows pores resulting in a void area lower than the void area of the pellet structure. Preferably the number of the pores on the external skin are less than 80%, more preferably less than 50%, of the pores per unit of area detectable in the internal structure of the pellet. Said pores are preferably isolated from each other. Preferably, the external skin pores show a mean equivalent diameter of less than 100 μm, preferably less than 50 μm, more preferably less than 30 μm and even more preferably less than 20 μm. In any case it is preferred that the dimension of the pores at the surface is comparable with the dimension of the pores of the internal structure of the pellet.

More specifically the low porous external skin, allows vaporization and expansion of the water contained in the low density self-sealing pellets without significant escaping through a path of pores interconnected to the surface.

The skin can be easily inspected by SEM without fracturing the pellets.

Number and dimension of pores of the skin can be determined by SEM analysis inspecting micrographs at similar magnification of those obtained to inspect internal structure also if skin structures presents corrugation of the surface.

The low density self-sealing pellets comprise starch with no more cristallinity of type A, B or C and as less as possible residual granular structure (no maltese crosses under polarized light) as well as intrinsic viscosity (measured at 25° C. using as a solvent DMSO containing 0.5 wt % of LiCl) higher than 1.5 dl/g and lower than 3 dl/g, and far more preferably comprised between 1.9 and 2.8 dl/g. Because of these viscosity values, the starch of the pellets according to the present invention is defined "high viscosity". Thanks to the above properties, the pellets according to the present invention show viscoelastic behaviour suitable to produce during foaming a resilient foamed article. Particularly, in case of too low viscosity the pellets will be too brittle and not elastic enough to permit expansion.

The pellets according to the present invention are defined as "self sealing" with this expression being meant that said pellets, when foamed irreversibly adhere each other.

Thanks to their specific structural characteristics the biodegradable pellets according to the present invention are capable of expanding if subjected to irradiation by means of electromagnetic waves such as microwaves, radio waves or infrared radiation. Of these microwaves are preferred. The said irradiation may be accompanied by treatment to pressurise the pellets, but the properties of the pellets according to the present invention allows expansion also in conditions of atmospheric pressure. This aspect is of key importance and can permit a simple and safe scale-up of the process at industrial level.

In particular the porous internal structure combined with the low-porous external skin of the pellets according to the present invention allows the pellets to expand regularly, creating a material having a uniform distribution of cells within it.

As a result of this the expanded material achieves density values which are sufficiently low to enable it to be effectively used as a replacement for the foam materials conventionally used as protective packaging.

The pellets according to this invention comprise starch essentially free of native crystallinity.

Preferably they comprise starch and at least one other polymer of synthetic or natural origin.

The preferred range of compositions comprises:
10-99.5% by weight of starch essentially free of native crystallinity,
0.5-90% by weight of at least another polymer of synthetic or natural origin,
0.1-60% by weight of water,
with respect to the total dry weight of a pellet.

More preferably, the pellets according to the present inventions comprise:
50-98% by weight of starch essentially free of native crystallinity,
2-50% by weight of at least another polymer of synthetic or natural origin,
5-45% by weight of water,
with respect to the total dry weight of a pellet.

In the context of this application, by the expression "starch essentially free of native crystallinity" is meant a starch in which its native crystallinity has been completely disrupted or is in any event present in a quantity such as not to adversely affect the properties indicated below. In particular, starch essentially free from native crystallinity according to this invention does not have endothermic gelatinisation peaks associated with a ΔH of more than 0.4 J/g of dry starch when analysed by differential scanning calorimetry (DSC) in a hermetic capsule with a water/dry starch ratio of 4.

Preferably the starch essentially free of native crystallinity according to this invention has lost its native granular structure. As far as the native granular structure is concerned, this can be advantageously identified by optical phase contrast microscopy. The presence of residual granular structures can be also detected by SEM analysis.

Preferably the starch which can be used to prepare the pellets may be a refined starch, a corn starch (so-called grits) containing starch and cellulose materials and/or lignin. Particularly suitable according to the invention are potato starch, wheat starch, rice starch, pea starch, starch from legumes, sorghum, tapioca and yucca as well as starches having a high content of amyloses, preferably in excess of 30% by weight, and "waxy" starches. It is also possible to use mixtures of starches. Potato starch, tapioca starch, and binary mixtures of these are particularly preferred and tapioca starch is even more preferred. Physically and chemically modified starch, for example starch ethoxylate, oxypropylate, acetate, butyrate, propionate, with a degree of substitution between 0.1 and 2.5, cationic starch, oxidised starch, cross-linked starch, gelatinised starch, partly or completely destructured starch, complex starch or mixtures thereof may also be used in the process for preparing pellets.

Starch is present in the pellets in a quantity of between 10 and 99.5%, preferably between 20 and 99%, more preferably between 40 and 98.5% and even more preferably between 50-98% by weight with respect to the total dry weight of a pellet.

In addition to starch the pellets preferably contain at least another polymer of synthetic or natural origin.

This is preferably present in a quantity between 0.5 and 90% by weight, preferably between 1 and 80% and more preferably between 1.5 and 60% and even more preferably between 2-50% by weight with respect to the total dry weight of a pellet.

In the case of natural polymers these are preferably selected from cellulose, lignin, proteins such as gluten, zein, casein, collagen, gelatin, phospholipids, caseins, polysaccharides such as pullulanes, alginates, chitin, chitosanes, natural rubbers, rosinic acid, dextrin, their mixtures and their derivatives such as for example esters or ethers. Cellulose may also be modified and in this respect mention may for example be made of esters of cellulose having a degree of substitution between 0.2 and 2.5. Thermoplastic lignin may also be used.

As far as synthetic polymers are concerned, these may also be obtained by fermentation and are advantageously selected from:

a. thermoplastic polymers comprising homopolymers and copolymers of straight or branched chain aliphatic hydroxy acids having a main $C_2$-$C_{24}$ chain, their lactones and lactides, as well as their copolymers with aliphatic polyesters of diacids/diols. Among these poly-L-lactic acid, poly-D-lactic acid, poly-L-lactic-poly-D-lactic stereo complex and copolymers of L-lactic acid and D-lactic acid, poly-ε-caprolactones, poly glycolic acids, long and short chain polyhydroxy alkanoates of the polyhydroxy butyrates type and their copolymers with C5-C18 hydroxyalkanoates such as for example polyhydroxybutyrate valerate, polyhydroxybutyrate pentanoate, polyhydroxybutyrate hexanoate, polyhydroxybutyrate decanoate, polyhydroxybutyrate dodecanoate, polyhydroxybutyrate hexadecanoate, and polyhydroxybutyrate octadecanoate are preferred, b. vinyl polymers comprising polyvinyl alcohol with different degrees of hydrolysis which may also be modified with acrylates or methacrylates, polyvinyl alcohol-co-vinylacetate either block and random copolymer with degree of hydrolysis>70%, preferably higher than 80 and even preferably higher than 85 mol %, polyvinyl alcohol plasticised or modified in order to lower its melting point, polyvinyl acetate, copolymers of vinyl acetate having various degrees of hydrolysis with vinyl pyrrolidone and/or styrene, polyethyloxazoline or polyvinyl pyrridine, c. polycarbonates, for example of the polyalkylene carbonate type, d. ethylene-vinyl alcohol copolymers, preferably containing up to 50% and more preferably 10-44% by weight of ethylene units, ethylene copolymers with vinyl acetate or unsaturated acids, 6, 6-6, 6-9, 6-10, 9, 9-9, 10, 10-10, 11, 11-11, 12, 12-12 polyamides and their mixtures, aliphatic polyurethanes, random and block copolymer polyurethane-polyamides, polyurethane-polyethers, polyurethane-polyesters, polyamide-polyesters, polyester-polyethers and epoxy resins, e. polyesters and copolyesters of aliphatic and/or aliphatic-aromatic diacids-diols, both random and block. As far as the aliphatic polyesters and copolyesters are concerned, these comprise $C_2$-$C_{22}$ aliphatic diacids and aliphatic diols. The aliphatic-aromatic polyesters and copolyesters instead have an aromatic part comprising mainly at least one aromatic acid having multiple functional groups, such as terephthalic acid and 2,5-furandicarboxylic acid, or mixtures thereof, the aliphatic part comprising $C_2$-$C_{22}$ aliphatic diacids and aliphatic diols, f. synthetic rubbers such as for example polybutadiene, nitrile rubber, for example BUNA-S and BUNA-N, chlorobutadiene (Neoprene), polyisoprene, butadiene-ethylene-propylene terpolymers, g. non-biodegradable polymers such as for example polyolefins, for example polypropylene and polyethylene, aromatic polyesters, for example polyethylene terephthalate, polybutylene terephthalate, polytrimethylene terephthalate, polyvinyl chloride, polystyrene, acrylonitrile-butadiene-styrene copolymers, h. Polyoxyalkylenes having a molecular weight >50,000 and more preferably >100,000.

Mixtures of the synthetic polymers mentioned in point a. to h. are also preferred, and mixtures of synthetic and natural polymers are particularly preferred.

The water content of the pellets according to this invention preferably lies between 0.1 and 60%, preferably between 5 and 45%, and even more preferably between 15 and 40% with respect to the total dry weight of a pellet.

The water content encourages adhesion between the pellets after expansion and makes it possible for example to produce three-dimensional structures which are particularly suitable for the manufacture of protective packaging (so-called foam blocks). In particular, if caused to expand within a mould the pellets according to this invention make it possible to manufacture three-dimensional blocks of foam material even without the addition of specific additives or surface treatments on the foamable pellets.

According to requirements, for example transport or storage, it is also possible to modulate the water content so as to avoid problems associated with undesired adhesion between the as yet unexpanded pellets and/or the development of moulds. In this case it is sufficient to rehydrate the pellets in order to be able to use them for the production of foamed articles.

The biodegradable pellets according to this invention preferably comprise one or more plasticisers. When used these are present in quantities of between 0.1 and 20%, preferably between 0.5 and 5% by weight with respect to the total dry weight of the composition.

Plasticisers may comprise all the compounds known for the purpose to those skilled in the art such as for example glycerine, polyglycerol, sorbitol, mannitol, erythritol, low molecular weight polyvinyl alcohol, as well as oxyethylate or oxypropylate derivates of the aforementioned compounds. Of these, glycerine is preferred.

The pellets according to this invention may also comprise one or more nucleating agents. The quantity of these agents is preferably between 0.005 and 5%, more preferably between 0.05 and 3% and even more preferably between 0.2 and 2% by weight with respect to the total dry weight of a pellet.

Usable nucleating agents are, for example, inorganic compounds such as talc (magnesium silicate), calcium carbonate, nano particles such as montmorillonites and hydrotalcites. These agents may possibly receive surface treatment with adhesion promoters such as silanes, titanates, etc. Organic fillers such as the husks of yeasts originating from the processing of beet, dried, ground and powdered beet pulp, sawdust, cellulose powder, lignin and its derivatives, etc., may be used.

The nucleating agent may be added in pure form or as an alternative in the form of masterbatch. In this case the masterbatch may contain quantities of between 10 and 50% of one or more nucleating agents.

The pellets according to this invention may also include other additives such as for example flame retardants, anti-moulding agents, pigments, colouring agents, rodent repellants, lubricants, dispersants, surfactants, physical or chemical expansion agents, mineral and natural fillers, fibres and microfibres.

Particularly, the pellets according to this invention may comprise one or more antimoulding agents, such as for example organic compounds such as sorbic acid and its salts and primaricin, in quantity preferably of 0.005-5%, more preferably of 0.05-3% and even more preferably of 0.2-2% by weight with respect to the total dry weight of a pellet. Among antimoulding agents, potassium sorbate is particularly preferred.

The antimoulding agent may be added in pure form or in the form of masterbatch.

Retardants such as peroxides, mono-, di- and poly-epoxides, acrylate polyepoxides and their copolymers with styrene, aliphatic, aromatic or aliphatic-aromatic oligomer and polymer carbodiimides, isocyanates, isocyanurates and their combinations, and hydrides and polyanhydrides which are compatible with starch and other synthetic or natural polymers may also be added.

Preferably the pellets according to this invention have a density<1.1 g/cm3 and higher than 0.5 g/cm3 and more preferably less than 1 g/cm3 and higher than 0.6 g/cm3

As far as measurement of the density of the pellets according to this invention is concerned, this may be carried out as follows: a number of pellets indicatively between 60 and 70 is weighed and their weight is recorded ($P_g$).

A volume of silica $V_1$, for example glass beads, unwashed—150-212 μm (Sigma Aldrich), such as to completely fill a graduated cylinder (for example 100 mL) is weighed on an analytical balance (accuracy 0.01 g) and its weight $P_1$ is recorded. The density of the silica is thus determined using the following formula:

$$d_{Silica} = \frac{P_1}{V_1}$$

A number N of pellets selected in such a way that they occupy approximately 60-70% of its volume are placed in the same graduated cylinder which has previously been emptied. Subsequently it is made up to volume using the silica previously measured, taking care to compact it carefully. The remaining silica is weighed ($P_2$) on an analytical balance (sensitive to 0.01 g) and the volume of the individual pellets is calculated using the following formula:

$$\text{Mean density of the pellets} = \frac{(d_{silica})}{(P_2)} \cdot P_g$$

The same procedure may be used to measure the density of the pellets after expansion.

The pellets according to the invention preferably have an intrinsic viscosity (measured at 25° C. using as a solvent DMSO containing 0.5 wt % of LiCl) higher than 1.5 dl/g and lower than 3 dl/g, preferably comprised between 1.9 and 2.8 dl/g and more preferably comprised between 2 and 2.7 dl/g.

As far as the intrinsic viscosity measurement is concerned, it can be performed directly on the pellets material when the pellet polymeric component are soluble in DMSO. Otherwise the intrinsic viscosity measurement is performed on the DMSO soluble fraction of the pellet. Separation of the DMSO soluble fraction of the pellet can be performed by means of filtration or centrifugation.

The pellets according to this invention are biodegradable according to standard EN 13432.

The pellets according to this invention are preferably prepared through a process characterised in that it comprises the following stages:
  (a) feeding a composition comprising starch and water to an extruder,
  (b) extruding said composition to form a melt and at an extrusion rate, residence time, and shear rate at the outlet of the nozzle, suitable to destroy the native crystallinity of the starch and to produce a swelling followed by collapsing of the extrudate on leaving the nozzle,
  (c) cutting the collapsed extrudate into the form of pellets soon after the exit from the die to seal possible open pores and reconstitute a skin at the cut surface,
  (d) conditioning said pellet in order to adjust the moisture content at level between 10 and 45%, preferably between 15 and 40 and even more preferably between 20 and 30% with respect to the total dry weight of a pellet by exposure to air at room temperature or higher.

As far as stage (a) in the process is concerned, the composition fed to the extruder preferably comprises at least one other polymer. In stage (b) of the process either a single-screw or a twin-screw extruder may be used.

As far as stage (b) is concerned, when the composition comprises polymeric components which, in the presence of water content of the formulation, show a melting point below 100° C., preferred extrusion temperatures are comprised between 30 and 120° C., more preferably between 40 and 100° C.

Preferably stage (b) of the process is conducted imposing a shear rate at the outlet from the nozzle of between 20 and 700 s$^{-1}$, more preferably between 100 and 600 s$^{-1}$, and even more preferably between 120 and 400 s$^{-1}$.

On leaving the nozzle, the extrudate of stage (b), swell to a diameter preferably from 3 to 8 times greater than the diameter of the extruder die. After having been swollen, the extrudate collapses preferably reaching a final diameter which lies between 2 and 3 times the diameter of the extruder die.

Stage (c) of the process is advantageously performed using a blade cutting device, a so-called head cutter, directly on the extruder nozzle, in such a way that the extrudate is cut when it is not yet completely solidified.

Because of their specific structural characteristics the biodegradable pellets according to this invention are capable of expanding if subjected to irradiation by means of electromagnetic waves such as microwaves, radio waves or infrared radiation. Of these microwaves are preferred. The said irradiation may also be advantageously accompanied by treatment to pressurise the pellets.

Examples of equipment and processes for the production of expanded articles by radiation are for example described in WO 02/14043, WO 03/037598 and WO2005/051628.

This invention also relates to foamed articles obtained from pellets according to this invention. In fact because of their specific structural characteristics the pellets according to this invention may be used for the production of foamed articles having mechanical properties, dimensions and a cell distribution and density such as to enable them to be effectively used in the protective packaging sector.

The foamed articles obtained from pellets according to this invention preferably comprise starch essentially free from native crystallisation in the meaning of this invention.

Preferably the foamed articles of the invention can reach a density lower than 80, preferably lower than 60, more preferably lower than 50 and even more preferably lower than 45 Kg/m3. Said foamed materials show a cellular structure with walls having mean thickness lower than 5 microns, preferably lower than 3 microns and more preferably lower than 1.5 microns As far as the wall thickness measurement is concerned, it can be performed on a portion of foamed material whose internal structure has been rendered accessible for examination. For this purpose the foamed material which is to be examined is immersed in liquid nitrogen and subsequently fractured so as to obtain a fracture surface along a cross-section of the material. The portion of the foamed material which is to be examined is then dried and a thin layer of metal is deposited thereupon, for example a mixture of gold/palladium, using a "sputter coater". Finally the surface of the fracture is examined under a scanning electron microscope (SEM) and thickness of the visible walls are measured.

By the term walls is meant here the non expanded material interposed between two and no more than two cells.

The thickness of the walls is measured considering a magnification that permits to observe in a single picture a number of cells between 5 and 12. The thickness is measured (in perpendicular direction) taking into consideration more than 10 points for every cell. The measure is repeated on 10 pictures if the cells' distribution is not homogeneous. The mean values is expressed as:

$$\text{mean wall thickness} = \frac{\sum_{i=1}^{N} m_i}{N}$$

where:
N is the number of measures which can be seen in the SEM inside the fracture surface area examined,
$m_i$ is the single measure on the wall thickness.

The foamed articles according to the present invention show a good homogeneous and compact surface as well as an intrinsic viscosity of the foamed articles material in the range of 1.5-3 dl/g preferably of 1.9-2.8 dl/g. Such intrinsic viscosity values being measured with the same method used for the pellets.

In particular the foamed articles obtained from pellets according to this invention are particularly suitable for use as protective packaging for domestic electrical articles, electronics products, furniture, food packaging, agricultural packaging, for example in the form of:
  foamed blocks and/or sheets,
  foamed beads,
  sheet moulded packaging,
  multi-layer cardboard packaging with foamed beads, blocks and/or sheets according to the invention within it,
  combinations of foamed blocks on cardboard, board, plastic sheet, etc. substrates,
  loose fillers.

The foamed blocks and sheets may be used as such or further shaped through cutting for example using hot wire, blades or punches. They preferably have a density of less than 80 kg/m$^3$, more preferably less than 60 kg/m$^3$, more preferably of 50 kg/m$^3$ and even more preferably less than 45 kg/m$^3$.

Multi-layer packaging is preferably a sandwich structure. In this case the sandwich structure may be formed directly in the process of expanding the pellets according to the invention.

As far as the loose fillers obtained according to this invention are concerned, these may be used as such or as agglomerates. In the case of agglomerates, they may be prepared from loose fillers as such through the effect of adhesives and/or humidity, including during the stage of packaging itself.

EXAMPLE 1

Figure 1:
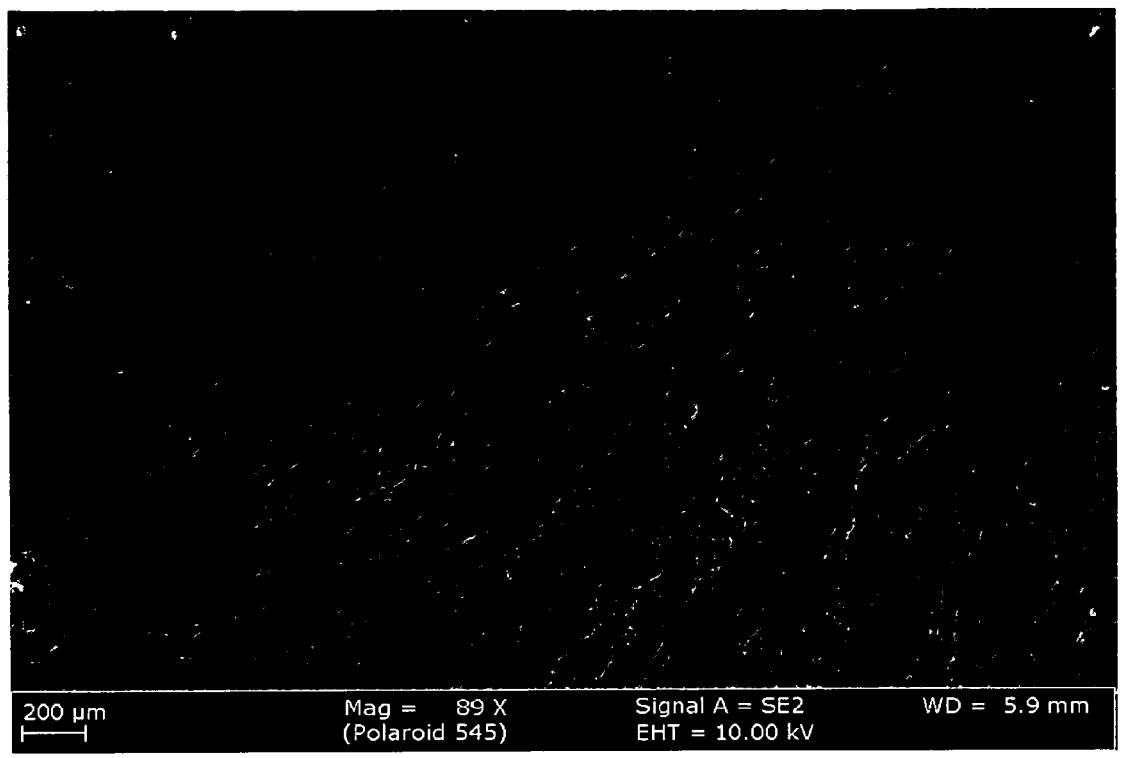
FIG. 1 shows the internal structure of the pellet according to Example 1.
Figure 2:
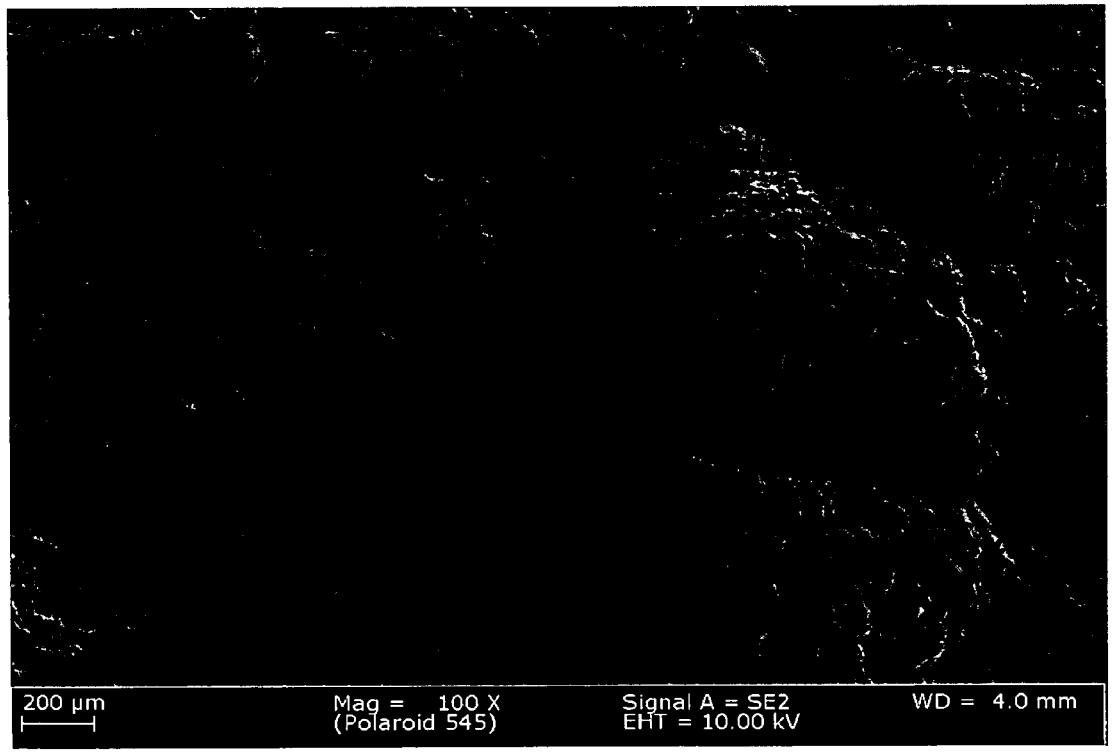
FIG. 2 shows the external skin of the pellet according to Example 1.
Figure 3:
FIG. 3 shows the foamed cylinder according to Example 2 (foamed at 55 kg/m$^3$).
Figure 4:
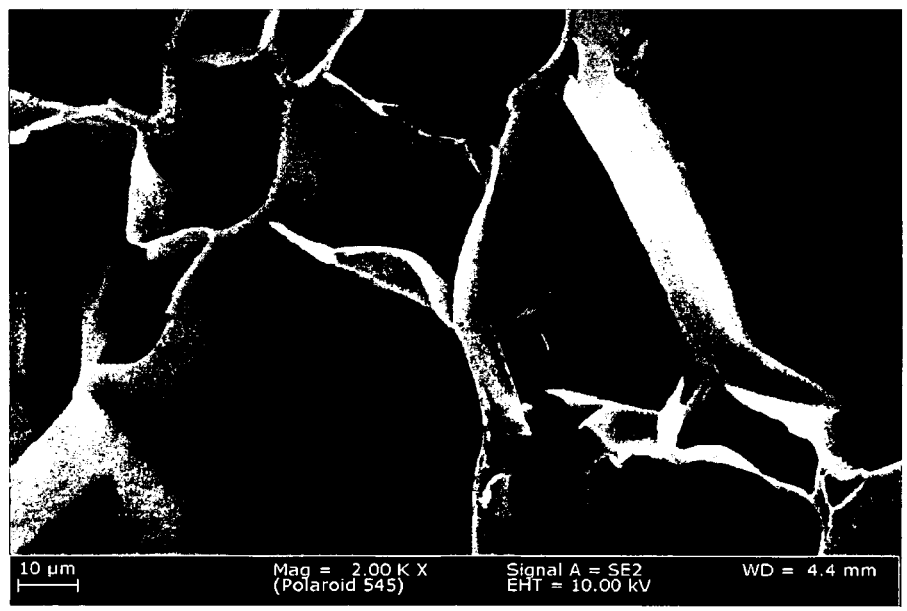
FIG. 4 shows the cell walls of the foamed block according to Example 2 (foamed at 55 kg/m$^3$).
Figure 5:
FIG. 5 shows the foamed cylinder according to Comparative Example 2 (foamed at 55 kg/m$^3$).
Figure 6:
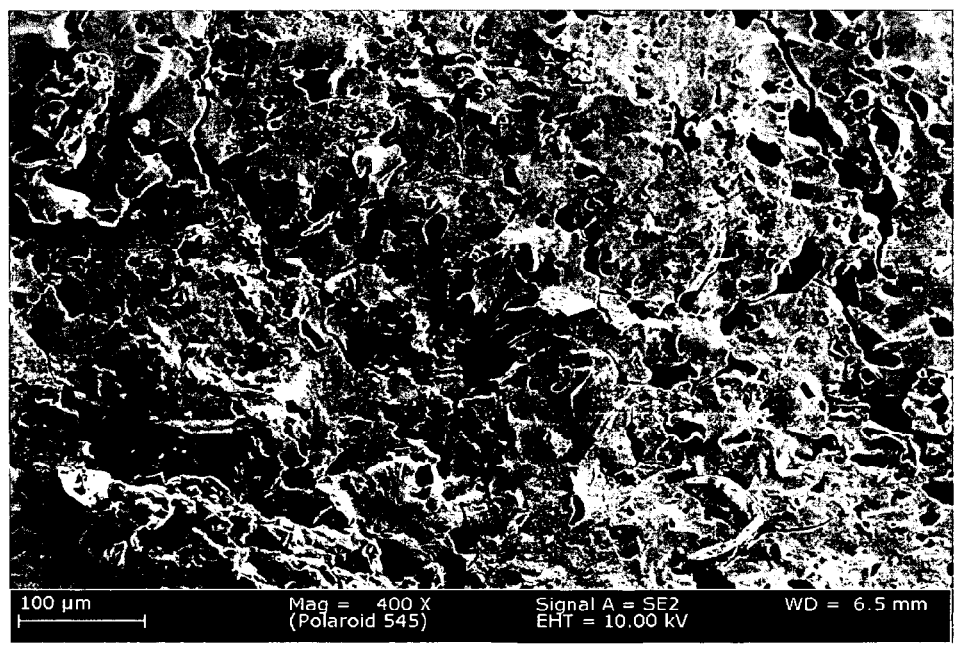
FIG. 6 shows the internal structure of the pellet according to Comparative Example 3.
Figure 7:
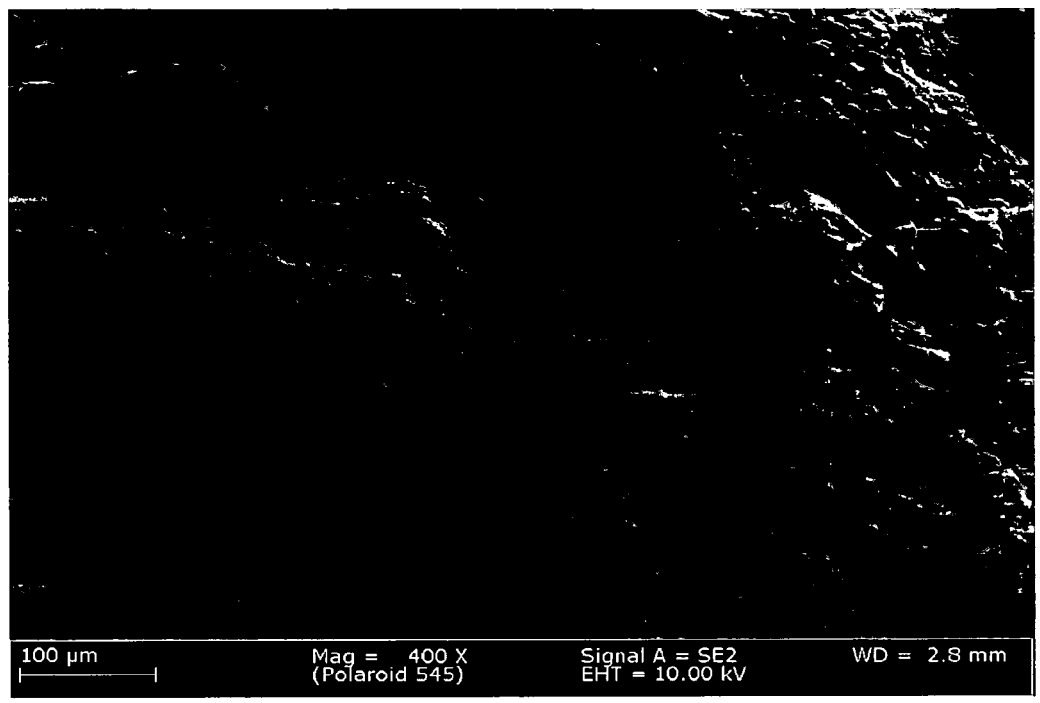
FIG. 7 shows the external skin of the pellet according to Comparative Example 3.
Figure 8:
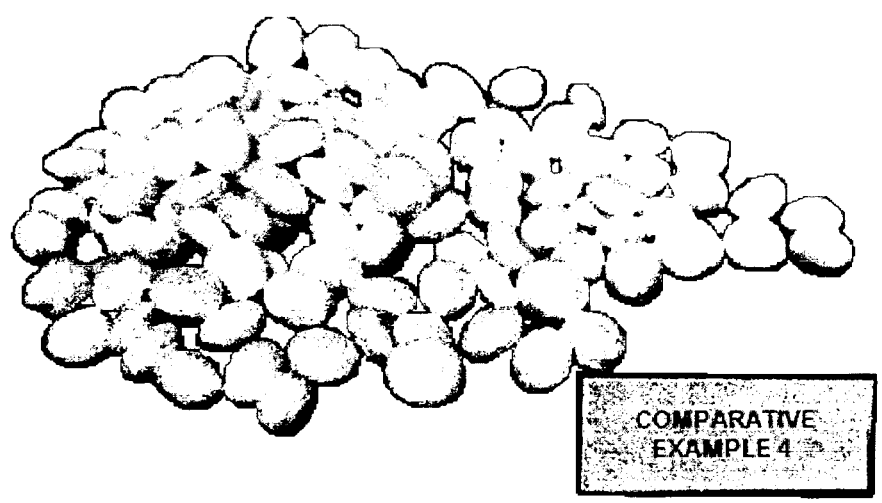
FIG. 8 shows the pellets after irradiation according to Comparative Example 4.

30 kg/hour of a polymer composition comprising 61.8% by weight of tapioca starch, 8.5% by weight of poly(vinyl alcohol) having a level of hydrolysis of 87%, 0.2% by weight of talc as nucleating agent and 29.5% by weight of water are fed to a single-screw extruder having the following characteristics:

D=51 mm,
L/D=8
RPM=350
Die diameter: 6 mm
Shear stress at the outlet 314 s$^{-1}$,
temperature profile: 40-45-50-50° C.,
T on the extruder head=78° C.

The extrudate, showing a swelling ratio of 5 (i.e. the ratio between the extrudate diameter on leaving the nozzle and the diameter of the extruder die), are then cut in form of pellets using a blade cutting device directly on the extruder nozzle. The pellets (5 minutes after the production) show a collapsing ratio (i.e. the ratio between the extrudate diameter after collapsing and the diameter of the extruder die) of 2.5 and a water content of 28.8%.

The pellets have been dried in oven at 50° C. in order to adjust the moisture content to 23.7% by weight and showed the following properties:

Density: 0.89 g/cm$^3$
Intrinsic viscosity: 2.43 g/dL
An internal porous structure with pore frequency (pore number/surface measured on SEM picture): 990/mm$^2$, covering a surface of 28% (void area) and having a mean equivalent diameter of 17 μm.
An external skin showing few isolated pores with a mean equivalent diameter of 10 μm Pellets have been also analysed by differential scanning calorimetry (DSC).

Approximately 2 grams of pellets were dried to a water content of 8% (±1%) in a ventilated stove at 50° C. and then ground at ambient temperature to a particle size of less than 200 microns.

2159 mg of water (water/dry starch ratio=4) were added to 700 mg of the ground material and homogenised. Approximately 22 mg of this mixture were then placed in a DSC analysis capsule hermetically sealed.

The calorimeter (Perkin Elmer DSC Diamond) was set to perform a single scan between 20 and 90° C. with a temperature gradient of 5° C./min. The graph was not showing detectable gelatinisation peaks.

EXAMPLE 2

Expansion by Irradiation in a Mould 152 g of pellets (useful for getting a density of 55 kg/m$^3$ in the foamed cylinder) prepared according to Example 1 were placed in a microwaves transparent mould (ULTEM®) with internal volume of 2240 cm$^3$ and provided with holes for steam degassing. The mould with the pellets within was subsequently placed in a microwave oven at atmospheric pressure having a power of 16 kW and irradiated for approximately 20 seconds.

The foamed cylinder obtained, presented the following properties:

It fills completely the mould;
The pellets showed self-adhesion property (all the pellets adhere each other);
It has an intrinsic viscosity of 2.35 g/dL
It has a wall mean thickness of 0.7 μm;
The article presents a three-dimensional structure that fills completely the mould. These characteristics enable it to be effectively used in the protective packaging sector.

EXAMPLE 3

Expansion by Irradiation in a Mould

Using the same conditions of Example 2, 221 g of pellets obtained in Example 1 in order to obtain a foamed cylinder having density of 80 kg/m$^3$

EXAMPLE 4

Foam Characterization

The foams obtained in Examples 2 and 3 were characterized in term of Dynamic Shock Cushioning Characteristic (measured according to ASTM D1596) in comparison to commercial EPS having density of 26 kg/m3.

The comparison was performed at fragility factor of 100 G's. in the following operative conditions;

Drop Height: 80 cm;
Sample diameter; 105 mm
Thickness; 50 mm and 75 mm
Temperature 23° C.,
Relative Humidity 50%

The following results were obtained:

| Material (average $2^{nd}$ $5^{th}$ impact) | Thickness | |
|---|---|---|
| | 50 mm Static Stress (kg/cm$^2$) | 75 mm Static Stress (kg/cm$^2$) |
| EPS- density 26 kg/m$^3$ | 0.07 | 0.18 |
| Example 2 | 0.10 | 0.22 |
| Example 3 | 0.22 | 0.45 |

COMPARATIVE EXAMPLE 1

Starch is Not Essentially Free of Native Crystallinity 30 kg/hour of a polymer composition comprising 61.8% by weight of tapioca starch, 8.5% by weight of poly(vinyl alcohol) having a level of hydrolysis of 87%, 0.2% by weight of talc as nucleating agent and 29.5% by weight of water were fed to a single-screw extruder having the following characteristics:
D=51 mm,
L/D=8,
RPM=250
Die diameter: 8.5 mm
Shear stress at the outlet 111 s$^{-1}$,
temperature profile: 40-45-50-50° C.,
T on the extruder head=78° C.

The extrudate so obtained, that showed a swelling ratio of 2.35, was then cut into the form of pellets using a blade cutting device, a so-called head cutter, directly on the extruder nozzle. The pellets (after 5 minutes after the production) had a collapsing ratio of 2 and a water content of 27%.

The pellets were dried in oven at 50° C. in order to adjust the moisture content to 22.7% by weight.

The pellets so obtained had the following properties:
Density of 0.9 g/cm$^3$
Intrinsic viscosity: 2.25 g/dL
A porous structure with density of pores (measured on SEM picture): 1375/mm$^2$, covering a surface of 26% and having a mean diameter of 13 μm.
A skin having isolated pores with a mean diameter of 9 μm These were also analysed by differential scanning calorimetry (DSC). Approximately 2 grams of pellets were dried to a water content of 8% (±1%) in a ventilated stove at 50° C. and then ground at ambient temperature to a particle size of less than 200 microns.

For the DSC analysis 2159 mg of water (water/dry starch ratio=4) were added to 700 mg of the ground material and all was homogenised. Approximately 22 mg of this mixture were then placed in a DSC analysis capsule which was then hermetically sealed.

The graph obtained shows an endothermic peak with a ΔH of 2.1 J/g of dry starch confirming a significant presence of residual native crystallinity in the starch.

COMPARATIVE EXAMPLE 2

Expansion by Irradiation in a Mould 152 g of the pellets (needed to reach a density of 55 kg/m$^3$ on the foam cylinder) obtained in Example comparative 1 were placed in a mould produced from a polymer which is transparent to microwaves (ULTEM®) having internal dimensions and an internal volume of 2240 cm$^3$ and provided with holes for the degassing of steam. The mould with the particles within was subsequently placed in a microwave oven at atmospheric pressure having a power of 16 kW and irradiated for approximately 20 seconds.

The foam cylinder obtained, presented the following properties:
It fills not completely the mould
It presents a limited adhesion with some pellets detached from the cylinder
It has an intrinsic viscosity of 2.13 g/dL

COMPARATIVE EXAMPLE 3

Not Porous Internal Structure is Present 30 kg/hour of a polymer composition comprising 61.8% by weight of corn starch, 8.5% by weight of poly(vinyl alcohol) having a level of hydrolysis of 87%, 0.2% by weight of talc as nucleating agent and 29.5% by weight of water were fed to a single-screw extruder having the following characteristics:
D=51 mm,
L/D=8,
RPM=350
Die diameter: 6 mm
temperature profile: 40-45-50-50° C.,
T on the extruder head=82° C.

The extrudate so obtained, that showed a swelling ratio of 2.0, was then cut into the form of pellets using a blade cutting device, a so-called head cutter, directly on the extruder nozzle. The pellets (after 5 minutes after the production) had a collapsing ratio of 2 and a water content of 29.8%.

The pellets were dried in oven at 50° C. in order to adjust the moisture content to 22.3% by weight.

The pellets so obtained had the following properties:
Density of 1.08 g/cm$^3$
Intrinsic viscosity: 1.7 g/dL
A porous structure with density of pores (measured on SEM picture): 954/mm$^2$, covering a surface of 10% and having a mean diameter of 10 μm.
A lacerated skin having several not isolated and interconnected pores with a mean diameter of 36.7 μm.

These were also analysed by differential scanning calorimetry (DSC). Approximately 2 grams of pellets were dried to a water content of 8% (±1%) in a ventilated stove at 50° C. and then ground at ambient temperature to a particle size of less than 200 microns.

For the DSC analysis 2159 mg of water (water/dry starch ratio=4) were added to 700 mg of the ground material and all was homogenised. Approximately 22 mg of this mixture were then placed in a DSC analysis capsule which was then hermetically sealed.

The graph obtained did not show any detectable gelatinisation peak

COMPARATIVE EXAMPLE 4

Expansion by Irradiation in a Mould 152 g of the pellets (needed to reach a density of 55 kg/m$^3$ on the foam cylinder) obtained in Example comparative 3 were placed in a mould produced from a polymer which is transparent to microwaves (ULTEM®) having internal dimensions and an internal volume of 2240 cm³ and provided with holes for the degassing of steam. The mould with the particles within was subsequently placed in a microwave oven at atmospheric pressure having a power of 16 kW and irradiated for approximately 20 seconds.

The product after irradiation, presented the following properties:
It isn't foamed
Pellets do not adhere each other
It has an intrinsic viscosity of 1.7 g/Dl.

What is claimed is:

1. A process for the preparation of foamed articles, said process comprising irradiating biodegradable low density, self-sealing pellets, said pellets comprising starch essentially free of native crystallinity which does not have endothermic gelatinisation peaks associated with a ΔH of more than 0.4 J/g of dry starch when analysed by differential scanning calorimetry in a hermetic capsule with a water/dry starch ratio of 4, said pellets being characterized by:
   a porous internal structure having void area greater than 15% with respect to the area of the cross-section of the pellet;
   a mean equivalent diameter of pores less than 100 microns and
   an external skin with pores in number less than 80% with respect to the internal structure having a mean equivalent diameter lower or equal to the mean equivalent diameter of the pores of the internal structure,
wherein said pellets contain from 50 to 98% by weight of said starch.

2. The process according to claim 1, wherein said pellets comprise at least a further polymer of synthetic or natural origin.

3. The process according to claim 2, wherein said pellets comprise:
   10-99.5% by weight of starch essentially devoid of native crystallinity,
   0.5-90% by weight of at least a further polymer of synthetic or natural origin,
   0.1-60% by weight of water,
with respect to the total weight of the dry pellet.

4. The process according to claim 2, wherein said further polymer of natural origin is selected from the group consisting of cellulose, lignin, proteins, phospholipids, casein, polysaccharides, natural gums, rosinic acid, dextrins, their mixtures and derivatives thereof.

5. The process according to claim 2, wherein said further polymer of synthetic origin is selected from the group consisting of:
   thermoplastic polymers comprising homopolymers and copolymers of linear or branched aliphatic hydroxyacid having C2-C24 main chain, their lactons and lactides as well as their copolymers with aliphatic polyesters of the diacid/diol type;
   vinyl polymers comprising polyvinyl alcohol with various degrees of hydrolysis, possibly modified with acrylates or methacrylates, polyvinyl alcohol-co-vinylacetate block and random copolymers with degree of hydrolysis >70%, preferably higher than 80 and even preferably higher than 85 mol %, polyvinyl alcohol plasticized or modified for the purpose of lowering its melting point, polyvinylacetate, copolymers of vinylacetate at various degrees of hydrolysis with vinylpyrrolidone and/or styrene, polyethyloxazoline or polyvinylpiridine;
   polycarbonates;
   ethylene-vinyl alcohol copolymers, preferably with up to 50% by weight of ethylenic units, copolymers of ethylene with vinyl acetate or unsaturated acids, polyamides 6, 6-6, 6-9, 6-10, 9, 9-9, 10, 10-10, 11, 11-11, 12, 12-12 and their mixtures, aliphatic polyurethanes, random and block copolymers polyurethane-polyamide, polyurethane-polyether, polyurethane-polyesters, polyamide-polyether, polyamide-polyester, polyester-polyether and epoxy resins;
   random and block aliphatic and aliphatic-aromatic polyesters and copolyesters of the diacid/diol type;
   synthetic rubbers;
   non-biodegradable polymers such as polyolefins, aromatic polyesters, polyvinylchloride, polystyrene, acrylonitrile-butadiene-styrene copolymers; and
   polyoxyalkylenes with molecular weight >50000.

6. The process according to claim 5, wherein said further polymer of synthetic origin is a polyvinyl alcohol-co-vinylacetate copolymer with degree of hydrolysis >70 mol %.

7. The process according to claim 1, wherein said pores are characterized by a mean equivalent diameter of less than 50 μm.

8. The process according to claim 1, wherein said pellets, when conditioned to a water content of 22±2% by weight with respect to the total weight of the dry composition, have a density <1.1 g/cm³ and higher than 0.5 g/cm³.

9. The process according to claim 1, wherein said starch shows an intrinsic viscosity higher than 1.5 dl/g and lower than 3 dl/g.

10. The process according to claim 1, comprising prior to said irradiating the steps of:
    (a) feeding a composition comprising starch and water to an extruder,
    (b) extruding said composition to form a melt and at an extrusion rate, residence time and shear rate at the outlet suitable to destroy the native crystallinity of the starch and to produce a swelling followed by collapsing of the extrudate on leaving the nozzle,
    (c) cutting the collapsed extrudate into the form of pellets soon after the exit from the die in such a way that the extrudate is cut when it is not yet completely solidified to seal possible open pores and reconstitute a skin at the cut surface,
    (d) conditioning said pellets in order to adjust the moisture content at level between 10 and 45%, with respect to the total dry weight of a pellet by exposure to air at room temperature or higher to thereby produce said biodegradable low density, self-sealing pellets.

11. The process according to claim 3, wherein said further polymer of natural origin is selected from the group consisting of cellulose, lignin, proteins, phospholipids, casein, polysaccharides, natural gums, rosinic acid, dextrins, their mixtures and derivatives thereof.

12. The process according to claim 3, wherein said further polymer of synthetic origin is selected from the group consisting of:
    thermoplastic polymers comprising homopolymers and copolymers of linear or branched aliphatic hydroxyacid having C2-C24 main chain, their lactons and lactides as well as their copolymers with aliphatic polyesters of the diacid/diol type;
    vinyl polymers comprising polyvinyl alcohol with various degrees of hydrolysis, possibly modified with acrylates or methacrylates, polyvinyl alcohol-co-vinylacetate block and random copolymers with degree of hydrolysis >70%, preferably higher than 80 and even preferably higher than 85 mol %, polyvinyl alcohol plasticized or modified for the purpose of lowering its melting point, polyvinylacetate, copolymers of vinylacetate at various degrees of hydrolysis with vinylpyrrolidone and/or styrene, polyethyloxazoline or polyvinylpiridine;

polycarbonates;

ethylene-vinyl alcohol copolymers, preferably with up to 50% by weight of ethylenic units, copolymers of ethylene with vinyl acetate or unsaturated acids, polyamides 6, 6-6, 6-9, 6-10, 9, 9-9, 10, 10-10, 11, 11-11, 12, 12-12 and their mixtures, aliphatic polyurethanes, random and block copolymers polyurethane-polyamide, polyurethane-polyether, polyurethane-polyesters, polyamide-polyether, polyamide-polyester, polyester-polyether and epoxy resins;

random and block aliphatic and aliphatic-aromatic polyesters and copolyesters of the diacid/diol type;

synthetic rubbers;

non-biodegradable polymers such as polyolefins, aromatic polyesters, polyvinylchloride, polystyrene, acrylonitrile-butadiene-styrene copolymers; and polyoxyalkylenes with molecular weight >50000.

13. The process according to claim 4, wherein said further polymer of synthetic origin is selected from the group consisting of:

thermoplastic polymers comprising homopolymers and copolymers of linear or branched aliphatic hydroxyacid having C2-C24 main chain, their lactons and lactides as well as their copolymers with aliphatic polyesters of the diacid/diol type;

vinyl polymers comprising polyvinyl alcohol with various degrees of hydrolysis, possibly modified with acrylates or methacrylates, polyvinyl alcohol-co-vinylacetate block and random copolymers with degree of hydrolysis >70%, preferably higher than 80 and even preferably higher than 85 mol %, polyvinyl alcohol plasticized or modified for the purpose of lowering its melting point, polyvinylacetate, copolymers of vinylacetate at various degrees of hydrolysis with vinylpyrrolidone and/or styrene, polyethyloxazoline or polyvinylpiridine;

polycarbonates;

ethylene-vinyl alcohol copolymers, preferably with up to 50% by weight of ethylenic units, copolymers of ethylene with vinyl acetate or unsaturated acids, polyamides 6, 6-6, 6-9, 6-10, 9, 9-9, 10, 10-10, 11, 11-11, 12, 12-12 and their mixtures, aliphatic polyurethanes, random and block copolymers polyurethane-polyamide, polyurethane-polyether, polyurethane-polyesters, polyamide-polyether, polyamide-polyester, polyester-polyether and epoxy resins;

random and block aliphatic and aliphatic-aromatic polyesters and copolyesters of the diacid/diol type;

synthetic rubbers;

non-biodegradable polymers such as polyolefins, aromatic polyesters, polyvinylchloride, polystyrene, acrylonitrile-butadiene-styrene copolymers; and polyoxyalkylenes with molecular weight >50000.

14. The process according to claim 2, wherein said pores are characterized by a mean equivalent diameter of less than 50 µm.

15. The process according to claim 3, wherein said pores are characterized by a mean equivalent diameter of less than 50 µm.

16. The process according to claim 4 wherein said pores are characterized by a mean equivalent diameter of less than 50 µm.

17. The process according to claim 5, wherein said pores are characterized by a mean equivalent diameter of less than 50 µm.

18. The process according to claim 1, wherein said pellets further comprise a polyvinyl alcohol-co-vinylacetate copolymer with degree of hydrolysis >70 mol %; wherein said pores are characterized by a mean equivalent diameter of less than 50 µm; wherein said starch shows an intrinsic viscosity higher than 1.5 dl/g and lower than 3 dl/g; and wherein said pellets when conditioned to a water content of 22±2% by weight with respect to the total weight of the dry composition, have a density <1.1 g/cm$^3$ and higher than 0.5 g/cm$^3$.

19. The process according to claim 1, wherein said pellets have dimensions of between 0.1 and 10 cm measured along the largest dimension of the pellets.

20. The process according to claim 1, wherein said irradiating is carried using electromagnetic waves comprising microwaves, radio waves or infrared radiation.

* * * * *